US009269233B2

(12) United States Patent
Aoki et al.

(10) Patent No.: US 9,269,233 B2
(45) Date of Patent: Feb. 23, 2016

(54) POKER GAME SYSTEM AND SYSTEM WITH A SECONDARY AWARD FEATURE HAVING AN EXPECTED VALUE DEPENDENT ON THE RANKING OF A PRIMARY GAME OUTCOME

(75) Inventors: Dion K. Aoki, Henderson, NV (US); Brian Manning, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 632 days.

(21) Appl. No.: 13/187,808

(22) Filed: Jul. 21, 2011

(65) Prior Publication Data

US 2012/0021813 A1 Jan. 26, 2012

Related U.S. Application Data

(60) Provisional application No. 61/479,681, filed on Apr. 27, 2011, provisional application No. 61/366,341, filed on Jul. 21, 2010.

(51) Int. Cl.
*A63F 13/00* (2014.01)
*G07F 17/32* (2006.01)

(52) U.S. Cl.
CPC ........ *G07F 17/3293* (2013.01); *G07F 17/3244* (2013.01)

(58) Field of Classification Search
CPC ......................... G07F 17/3244; G07F 17/3293
USPC ........................................................... 463/13
See application file for complete search history.

(56) References Cited

U.S. PATENT DOCUMENTS

| | | | | |
|---|---|---|---|---|
| 4,743,022 | A | 5/1988 | Wood | 273/85 |
| 5,294,120 | A | 3/1994 | Schultz | 273/85 |
| 5,308,065 | A | 5/1994 | Bridgeman et al. | 273/85 |
| 5,322,295 | A | 6/1994 | Cabot et al. | 273/292 |
| 5,401,023 | A | 3/1995 | Wood | 273/85 |
| 5,431,408 | A | 7/1995 | Adams | 273/306 |
| 5,437,451 | A | 8/1995 | Fulton | 273/138 |
| 5,489,101 | A | 2/1996 | Moody | 273/292 |
| 5,511,781 | A | 4/1996 | Wood et al. | 273/85 |
| 5,531,448 | A | 7/1996 | Moody | 273/292 |

(Continued)

FOREIGN PATENT DOCUMENTS

| | | | |
|---|---|---|---|
| WO | WO 97/27570 | 7/1997 | G07F 17/34 |
| WO | WO 03/083795 A1 | 10/2003 | G07F 17/32 |

(Continued)

OTHER PUBLICATIONS

Draw Poker Variants, web page (6 pages).

(Continued)

*Primary Examiner* — Milap Shah
*Assistant Examiner* — Thomas H Henry
(74) *Attorney, Agent, or Firm* — Nixon Peabody LLP

(57) ABSTRACT

A gaming system and method for conducting a poker-themed wagering game. A basic wager is accepted to play the poker-themed wagering game via a wager input device. A plurality of symbol-bearing objects are provided to form a user-playable hand on a display. A payoff is awarded based on a non-monetary ranking of the user-playable hand meeting a predetermined criterion via a controller. The opportunity to earn a bonus feature is provided. The bonus feature has an expected value based on the ranking of the user playable hand meeting one of the predetermined criterion.

27 Claims, 13 Drawing Sheets

(56) References Cited

U.S. PATENT DOCUMENTS

| | | | | | |
|---|---|---|---|---|---|
| 5,732,950 | A | | 3/1998 | Moody | 273/292 |
| 5,816,916 | A | | 10/1998 | Moody | 463/13 |
| 5,823,873 | A | | 10/1998 | Moody | 463/13 |
| 5,868,619 | A | * | 2/1999 | Wood et al. | 463/13 |
| 5,882,259 | A | | 3/1999 | Holmes, Jr. | 463/13 |
| 5,954,335 | A | | 9/1999 | Moody | 273/292 |
| 5,957,774 | A | | 9/1999 | Holmes, Jr. et al. | 463/13 |
| 5,976,016 | A | | 11/1999 | Moody et al. | 463/13 |
| 6,007,066 | A | | 12/1999 | Moody | 273/292 |
| 6,012,720 | A | | 1/2000 | Webb | 273/292 |
| 6,045,129 | A | | 4/2000 | Cooper et al. | 273/292 |
| 6,098,985 | A | | 8/2000 | Moody | 273/292 |
| 6,110,040 | A | | 8/2000 | Sanduski et al. | 463/13 |
| 6,120,378 | A | | 9/2000 | Moody et al. | 463/20 |
| 6,132,311 | A | | 10/2000 | Williams | 463/13 |
| 6,149,521 | A | | 11/2000 | Sanduski | 463/13 |
| 6,206,780 | B1 | | 3/2001 | Awada | 463/13 |
| 6,248,016 | B1 | | 6/2001 | Walker et al. | 463/13 |
| 6,257,979 | B1 | | 7/2001 | Walker et al. | 463/13 |
| 6,280,328 | B1 | | 8/2001 | Holch et al. | 463/42 |
| 6,336,860 | B1 | | 1/2002 | Webb | 463/22 |
| 6,416,407 | B1 | | 7/2002 | Carrico et al. | 463/13 |
| 6,461,240 | B1 | | 10/2002 | Perkins | 463/13 |
| 6,471,587 | B1 | | 10/2002 | Wood et al. | 463/13 |
| 6,474,645 | B2 | | 11/2002 | Tarantino | 273/274 |
| 6,494,454 | B2 | | 12/2002 | Adams | 273/292 |
| 6,517,433 | B2 | | 2/2003 | Loose et al. | 463/20 |
| 6,561,898 | B2 | | 5/2003 | Moody | 463/13 |
| 6,569,013 | B1 | | 5/2003 | Taylor | 463/13 |
| 6,569,014 | B2 | | 5/2003 | Walker et al. | 463/13 |
| 6,595,520 | B1 | | 7/2003 | Richards et al. | 273/292 |
| 6,595,852 | B2 | | 7/2003 | Wang | 463/13 |
| 6,612,926 | B1 | | 9/2003 | Dabrowski | 463/13 |
| 6,612,927 | B1 | | 9/2003 | Slomiany et al. | 463/16 |
| 6,616,142 | B2 | | 9/2003 | Adams | 273/292 |
| 6,637,747 | B1 | | 10/2003 | Garrod | 273/292 |
| 6,672,958 | B2 | | 1/2004 | Bennett | 463/13 |
| 6,708,975 | B1 | | 3/2004 | Fox et al. | 273/292 |
| 6,726,427 | B2 | | 4/2004 | Jarvis et al. | 413/12 |
| 6,780,106 | B2 | | 8/2004 | DeMar et al. | 463/16 |
| 6,857,957 | B2 | | 2/2005 | Marks et al. | 463/13 |
| 8,444,465 | B2 | * | 5/2013 | Macaulay | 463/13 |
| 2002/0034974 | A1 | | 3/2002 | Wood et al. | 463/13 |
| 2002/0169015 | A1 | | 11/2002 | Moody | 463/13 |
| 2002/0185816 | A1 | | 12/2002 | Moody et al. | 273/292 |
| 2003/0027626 | A1 | | 2/2003 | Marks et al. | 463/20 |
| 2003/0032469 | A1 | | 2/2003 | Moody et al. | 463/13 |
| 2003/0038425 | A1 | | 2/2003 | Tarantino | 273/274 |
| 2003/0045354 | A1 | | 3/2003 | Giobbi | 463/40 |
| 2003/0064773 | A1 | | 4/2003 | Baerlocher et al. | 463/16 |
| 2003/0119572 | A1 | | 6/2003 | Moody et al. | 463/13 |
| 2003/0153377 | A1 | | 8/2003 | Lisowski, Sr. | 463/13 |
| 2003/0166411 | A1 | | 9/2003 | Moody | 463/13 |
| 2003/0181232 | A1 | | 9/2003 | Peccole, Jr. | 463/13 |
| 2003/0186733 | A1 | | 10/2003 | Wolf et al. | 463/16 |
| 2003/0189290 | A1 | | 10/2003 | Moody | 273/292 |
| 2003/0214097 | A1 | | 11/2003 | Moody | 273/292 |
| 2003/0236115 | A1 | | 12/2003 | Chamberlain | 463/16 |
| 2004/0043807 | A1 | | 3/2004 | Pennington | 463/13 |
| 2004/0132524 | A1 | | 7/2004 | Ramstad et al. | 463/16 |
| 2004/0248641 | A1 | * | 12/2004 | Jarvis et al. | 463/20 |
| 2006/0030391 | A1 | * | 2/2006 | Casey et al. | 463/16 |
| 2007/0225076 | A1 | | 9/2007 | Aida | 463/42 |
| 2007/0293319 | A1 | | 12/2007 | Stamper et al. | 463/42 |

FOREIGN PATENT DOCUMENTS

| | | | | |
|---|---|---|---|---|
| WO | WO 2006/102441 | A2 | 9/2006 | A63F 9/24 |
| WO | WO 2007/089410 | A2 | 8/2007 | A63F 9/24 |

OTHER PUBLICATIONS

"Pay It Again Poker" Product Sheet, GameTech, Inc., 2 pages (Dated prior to Jul. 2, 2009).

* cited by examiner

POKER GAME SYSTEM AND SYSTEM WITH A SECONDARY AWARD FEATURE HAVING AN EXPECTED VALUE DEPENDENT ON THE RANKING OF A PRIMARY GAME OUTCOME

RELATED APPLICATIONS

This application claims priority from common subject matter in Provisional Application No. 61/479,681 filed Apr. 27, 2011 and Provisional Application No. 61/366,341 filed Jul. 21, 2010 to the same inventors. Those applications are hereby incorporated by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to poker-themed wagering games with the expected value of a secondary bonus based on the rank of a winning hand.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic-game, which is entered upon the occurrence of a selected event or outcome in the basic-game. Generally, bonus games provide a greater expectation of winning than the basic-game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Video draw poker has been played in gaming establishments for many years. In conventional video draw poker, a single player does not play against a dealer or other players, but rather attempts to achieve a highest possible poker-hand ranking. After a player makes an initial wager and is dealt five face-up cards from a standard 52-card deck, the player is allowed to discard and replace unwanted cards with replacement cards from the deck, resulting in a final card hand. The game then determines a poker-hand ranking of the final card hand and provides an award based on a pay table. The pay table includes a list of winning poker-hand rankings and the award for each ranking. The winning poker-hand rankings for a standard Jacks or Better video poker game include in order from highest to lowest: Royal Flush, Straight Flush, Four of a Kind, Full House, Flush, Straight, Three of a Kind, Two Pair and a Pair of Jacks or Better. Any poker hand having a ranking less than a Pair of Jacks or Better is a losing hand.

Manufacturers have developed variations to conventional video draw poker. One objective in developing such variations is to differentiate a video poker product from that of the competition. Another objective is to increase the speed of play and/or the number of coins or credits wagered. As casino patrons become bored or annoyed with existing variations to conventional video draw poker, gaming establishments are continually looking for new video poker games that will attract frequent play and hence increase profitability to the gaming establishment.

SUMMARY OF THE INVENTION

According to one example, a method of conducting a wagering game includes accepting a basic wager via a wager input device to play the wagering game including a plurality of winning outcomes. The plurality of winning outcomes are ranked according to predetermined non-monetary criteria. A payoff based on a winning outcome is awarded via a controller. The opportunity to earn a bonus feature with an expected value based on the ranking of the winning outcome is provided.

Another example is a gaming system including a display having a display area configured to display information or graphics to be displayed to a player including graphics of a wagering game. A wager input device receives a basic wager to play the wagering game. A controller is coupled to the display and the wager input device. The controller is configured to execute computer instructions relating to the wagering game operative to provide a plurality of symbol-bearing objects to form a final outcome. The controller also executes computer instructions to award a payoff based on a ranking of the final outcome meeting a predetermined criterion and provide the opportunity to earn a bonus feature with an expected value based on the ranking of the final outcome meeting one predetermined criterion. A probability of earning the bonus feature is associated with the met predetermined criteria.

Another example is a method of conducting a wagering game including accepting a basic wager to play the wagering game via a wager input device. A plurality of symbol-bearing objects is provided to form a final outcome on a display. A payoff is awarded based on a ranking of the final outcome meeting a predetermined criterion via a controller. The opportunity to earn a bonus feature is provided with an expected value based on the ranking of the final outcome meeting one of the predetermined criterion.

Another example is a method of conducting a poker-themed wagering game including accepting a basic wager to play the poker-themed wagering game via a wager input device. A plurality of symbol-bearing objects is provided to form a user-playable hand on a display. A payoff is awarded based on a ranking of the user-playable hand meeting a predetermined criterion via a controller. The opportunity to earn a bonus feature is provided with the probability of earning the bonus feature based on the ranking of the user playable hand meeting one of the predetermined criterion.

Another example is a method of conducting a poker-themed wagering game including accepting a basic wager to play the poker-themed wagering game via a wager input device. A plurality of symbol-bearing objects is provided to form a user-playable hand on a display. A payoff is awarded based on a ranking of the user-playable hand meeting a predetermined non-monetary criterion via a controller. The opportunity to earn a bonus feature is provided with an award value based on the ranking of the user playable hand meeting one of the predetermined criterion.

Additional examples will be apparent to those of ordinary skill in the art in view of the detailed description of various embodiments, which is made with reference to the drawings, a brief description of which is provided below.

DETAILED DESCRIPTION

Figure 1:
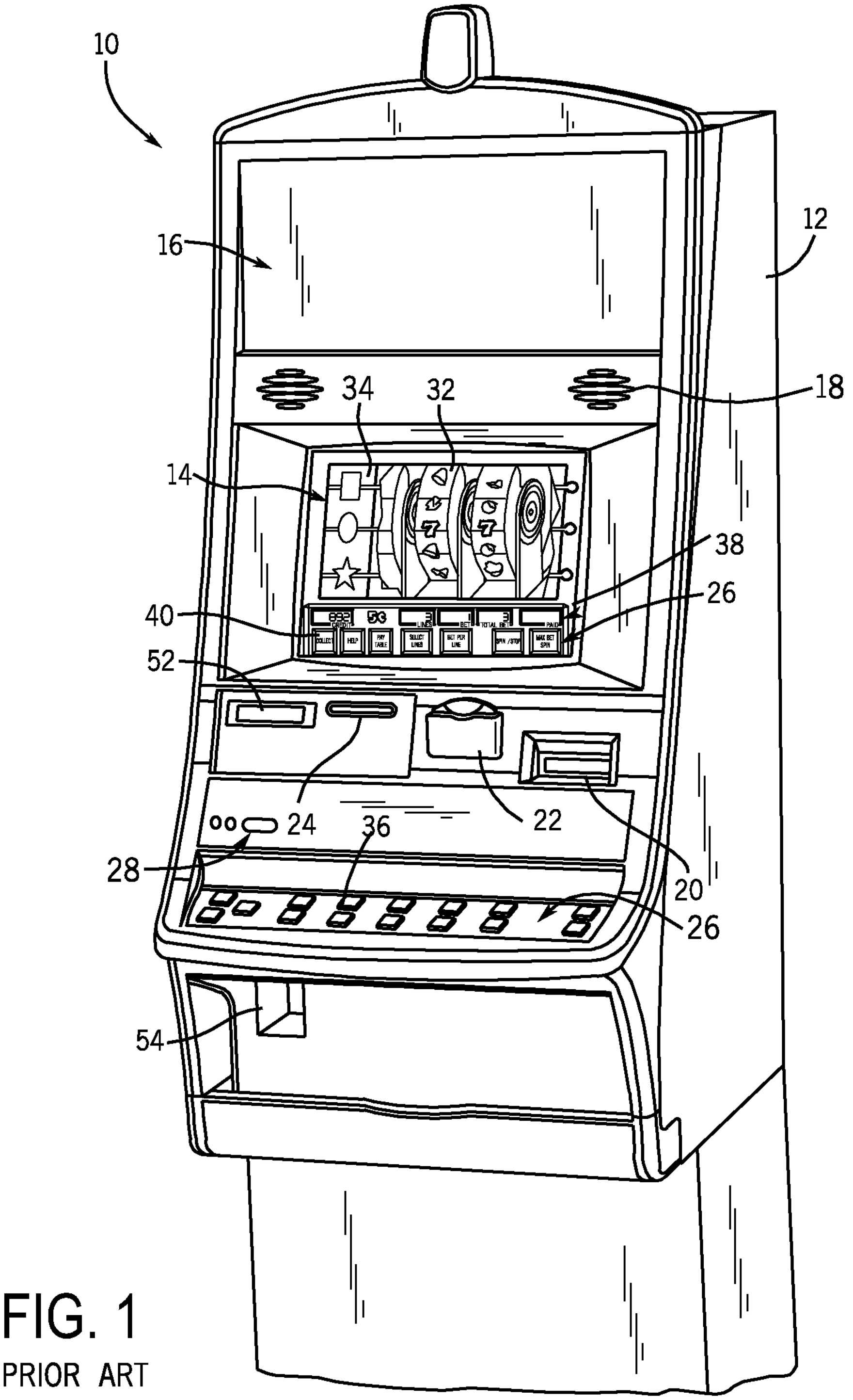
FIG. 1 PRIOR ART
FIG. 1 is a perspective view of a free-standing gaming terminal according to the present disclosure.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, e-mails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 includes, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
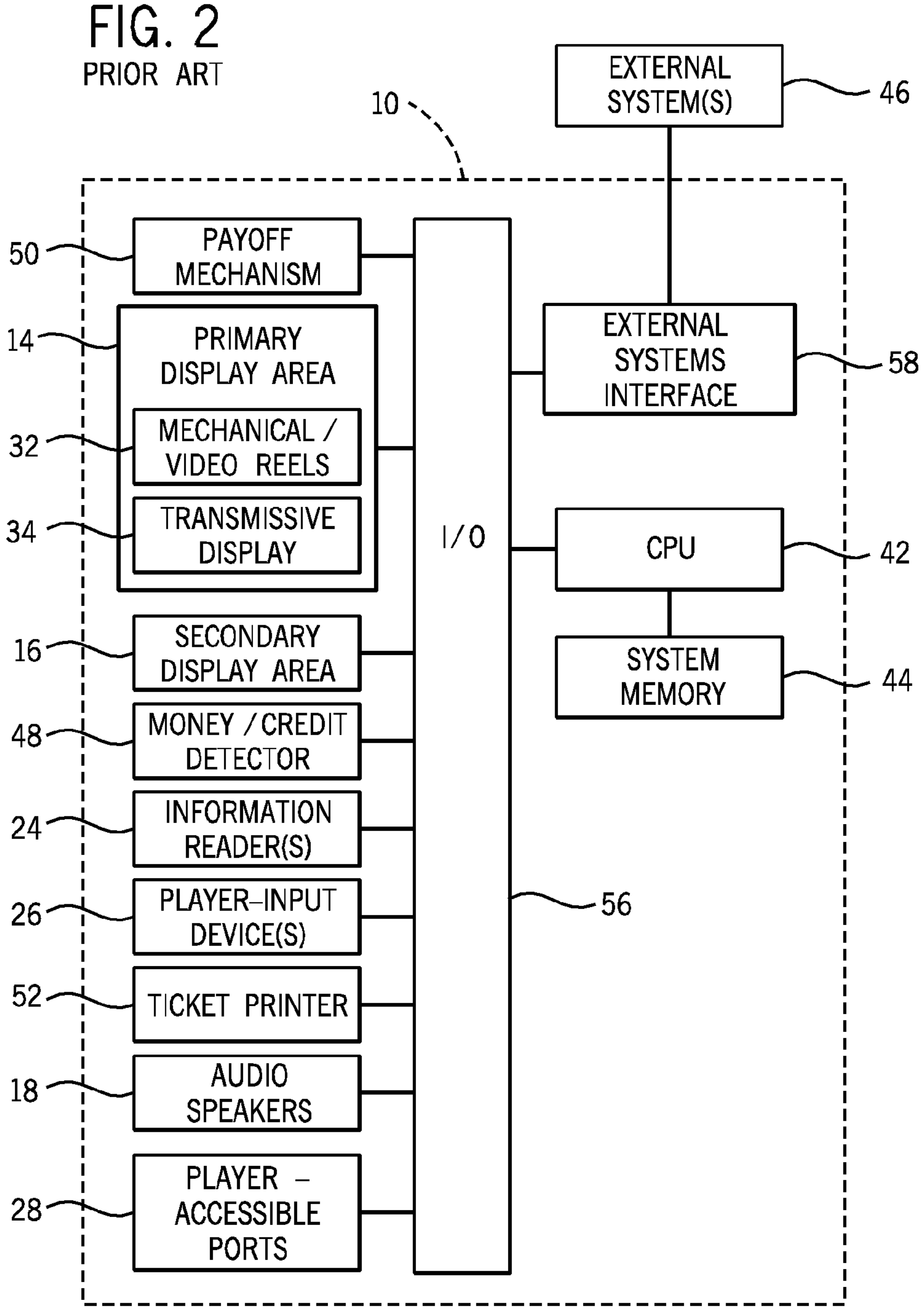
FIG. 2 PRIOR ART
FIG. 2 is a schematic view of a gaming system according to an example of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming terminal 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal to the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3A:
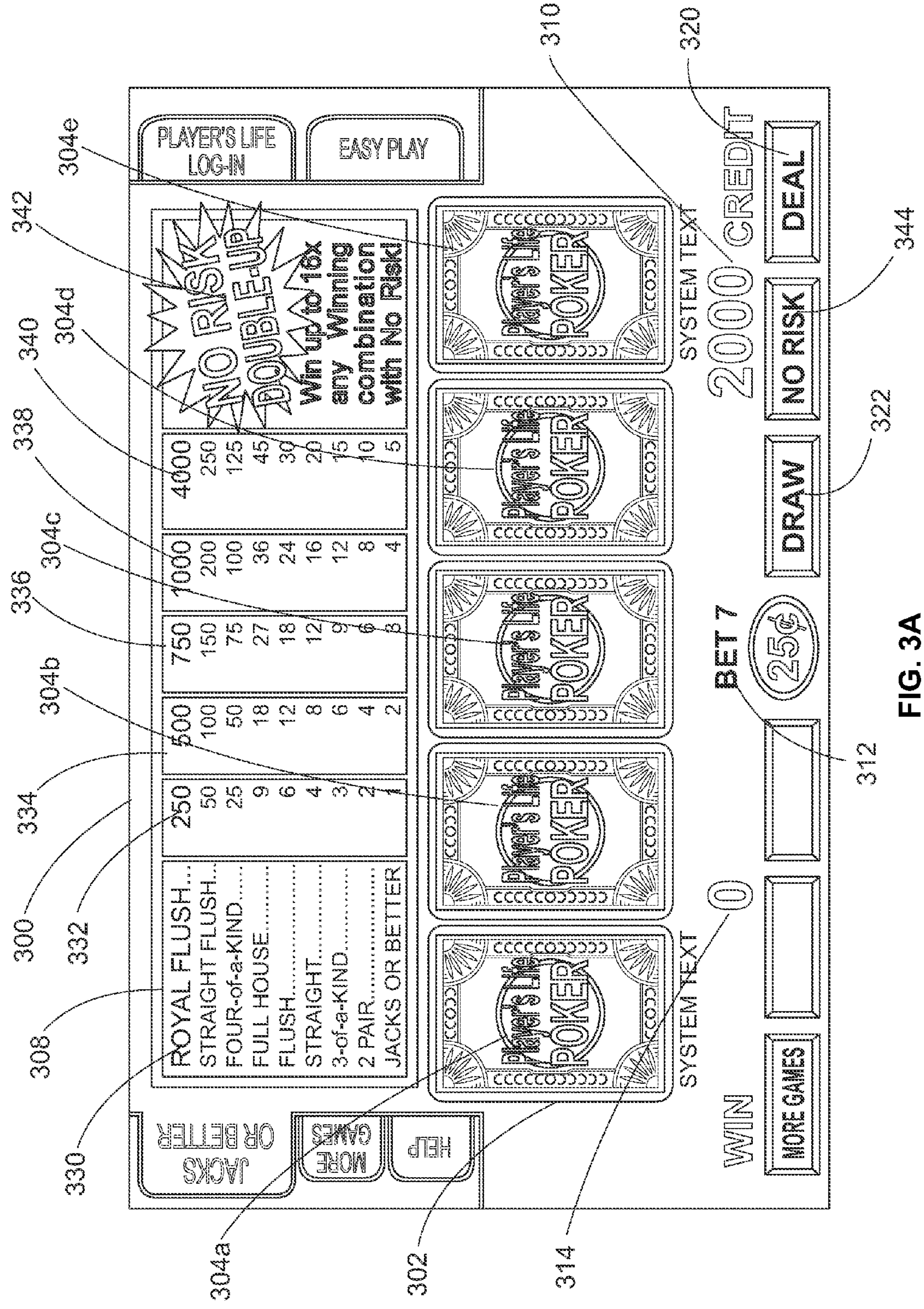
FIG. 3A is an image of a video poker-game shown on the display of the gaming machine in FIG. 1.

Referring now to FIG. 3A, an example image of a basic poker-themed game 300 adapted to be displayed on the primary display area 14 is illustrated. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game such as the poker-themed wagering game shown in FIG. 3A that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display area 14) through the display of information such as, but not limited to, text, graphics, text and graphics, static images, moving images, etc., or any combination thereof. In accord with the method of conducting the wagering game, the controller 42, which comprises one or more processors, transforms a physical player input, into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

In FIG. 3A, the image of a video poker-themed game 300 is preferably played with a symbol-objects such as a single standard 52-card deck (i.e., Ace through King of four different suits). However, a poker game may be played with any number of decks and/or with a variety of different card compositions (e.g., additional value objects, wild cards, etc.).

According to one example, during a particular poker hand, all of the cards are dealt from the same deck. After a card is dealt from the deck into the poker hand, the card is "used up" and cannot appear again until the next poker hand. The deck may be replenished and randomly shuffled prior to every poker hand. The system memory 44 includes a data structure for storing data representing each card of the deck. The controller 42 randomly selects cards for each poker hand from the data structure and controls the primary display area 14 to display the cards.

The poker-themed game image 300 features a basic wagering game such as a five-card draw-poker game in this example, which may be displayed on the primary display area 14. In the illustrated example, the image 300 of the basic poker-game displays a user-playable hand 302 composed of a plurality of cards 304*a-e*. The basic poker-game image 300 also displays a pay table 308, game-session meters, and various buttons selectable by a player.

The game-session meters include: a "credits" meter 310 for displaying a number of credits available for play on the machine; a "bet" meter 312 for displaying a number of credits wagered (e.g., from 1 to 5 credits); and a "paid" meter 314 for displaying an amount to be awarded based on the results of the particular round's outcome. The player-selectable buttons include a "cash out" button to collect the credits remaining in the credits meter 310; a "help" button for viewing instructions on how to play the video poker game; a "max bet" button for wagering a maximum number of credits (e.g., 5 credits). The wagering game is initiated after a wager is made by a "deal" button 320 for causing the game to initially deal cards from a deck into the user-playable hand 302 face-up. A "draw" button 322 causes the game to replace any non-held card in the user-playable hand 302 with another card from the deck.

The pay table 308, shown on the primary display area 14, may also or alternatively be displayed on the secondary display area 16 in FIG. 1. The pay table 308 includes a column listing winning-poker-hand rankings 330 and a plurality of payout columns 332, 334, 336, 338, and 340 with payouts associated with each ranking. The list of winning poker-hand-rankings 330 includes predetermined non-monetary criteria, which in this example are standard poker-hand rankings beginning at a pair of jacks or better and includes hands through a royal flush. The number of credits won is linearly proportional to the number of credits wagered, except that a royal flush typically yields a bonus when achieved on a maximum wager. In this example, the payout columns 332, 334, 336, and 338 list credits that are paid for 1, 2, 3, and 4 credits respectively. The maximum wager payouts for a basic wager of 5 credits are listed in the last column 340. A secondary bonus feature field 342 is also included for the no-risk double-up feature in this example. As will be explained below, the opportunity to be eligible for the no-risk double-up feature may be selected via a no-risk button 344 that adds 2 credits to the maximum wager in this example to activate the secondary-feature. The gaming terminal 10 in FIG. 1 may be configured to offer the player the above-mentioned basic wagering game.

Figure 3B:
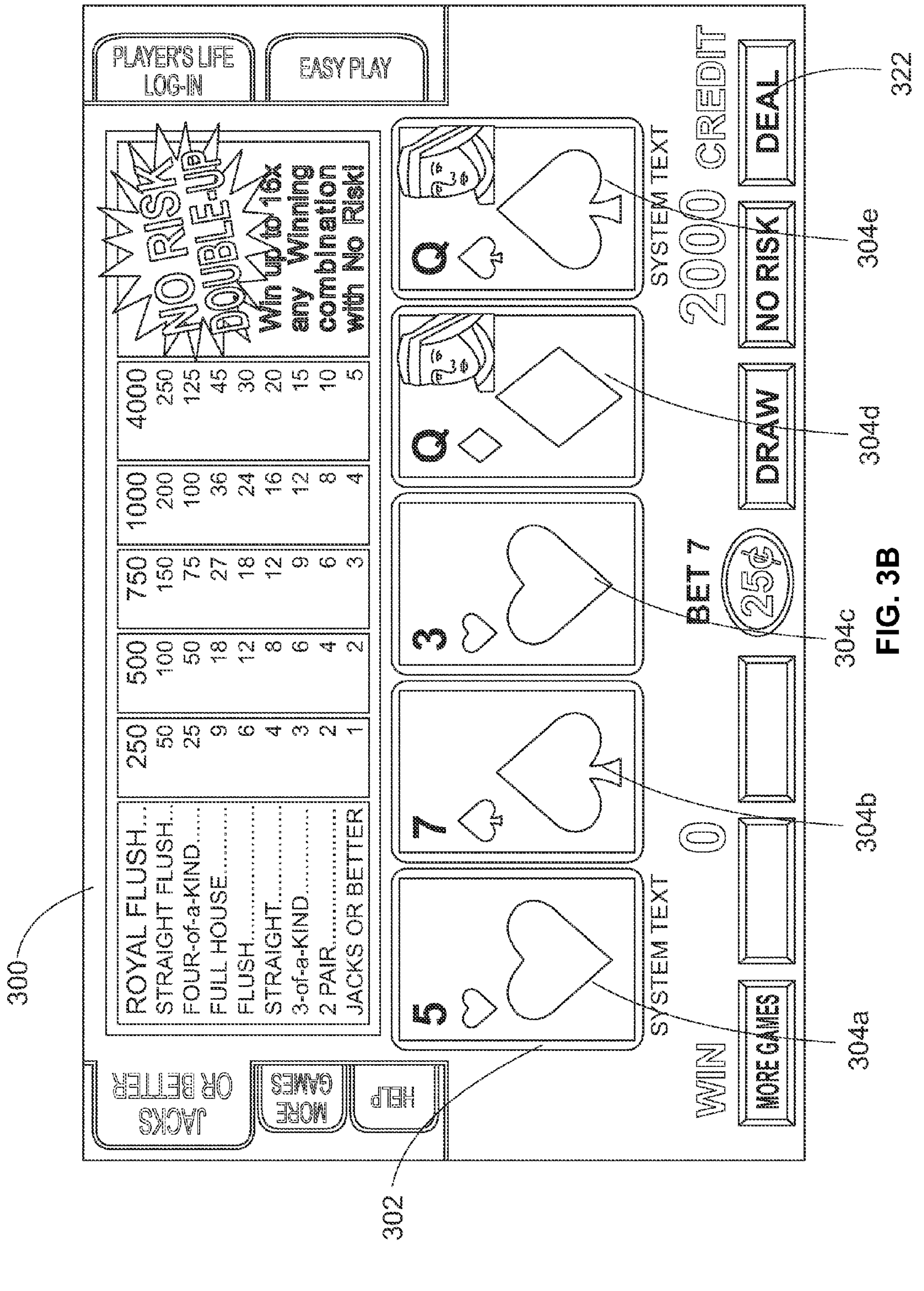
FIG. 3B is an image of the video poker-game in FIG. 3A showing the example poker-themed wagering game after a player selection of cards to discard.

According to one example, the basic wagering game is five-card draw poker. In a five-card draw-poker game, five cards 304*a-e* are displayed face-up to a player to form a first user-playable hand as shown in FIG. 3B once the wager is accepted and the player selects the deal button 320. The player is able to select none, one, or a plurality of the cards 304*a-e* in the user-playable hand to hold. However, the player generally will hold any winning cards (e.g., either card 304*d* or card 304*e* because they form a pair of queens, which form a hand specified in the pay table 308). In this example, if the first user-playable hand were to form a five-card straight or flush, full house, etc., and the player held all five of the dealt cards, the player would be awarded a payout and the gaming session would end. However, where one or more of the cards are not selected to be held, the non-selected card or cards may then be replaced to form a second user-playable hand—which in some examples is also the final user-playable hand.

Figure 3C:
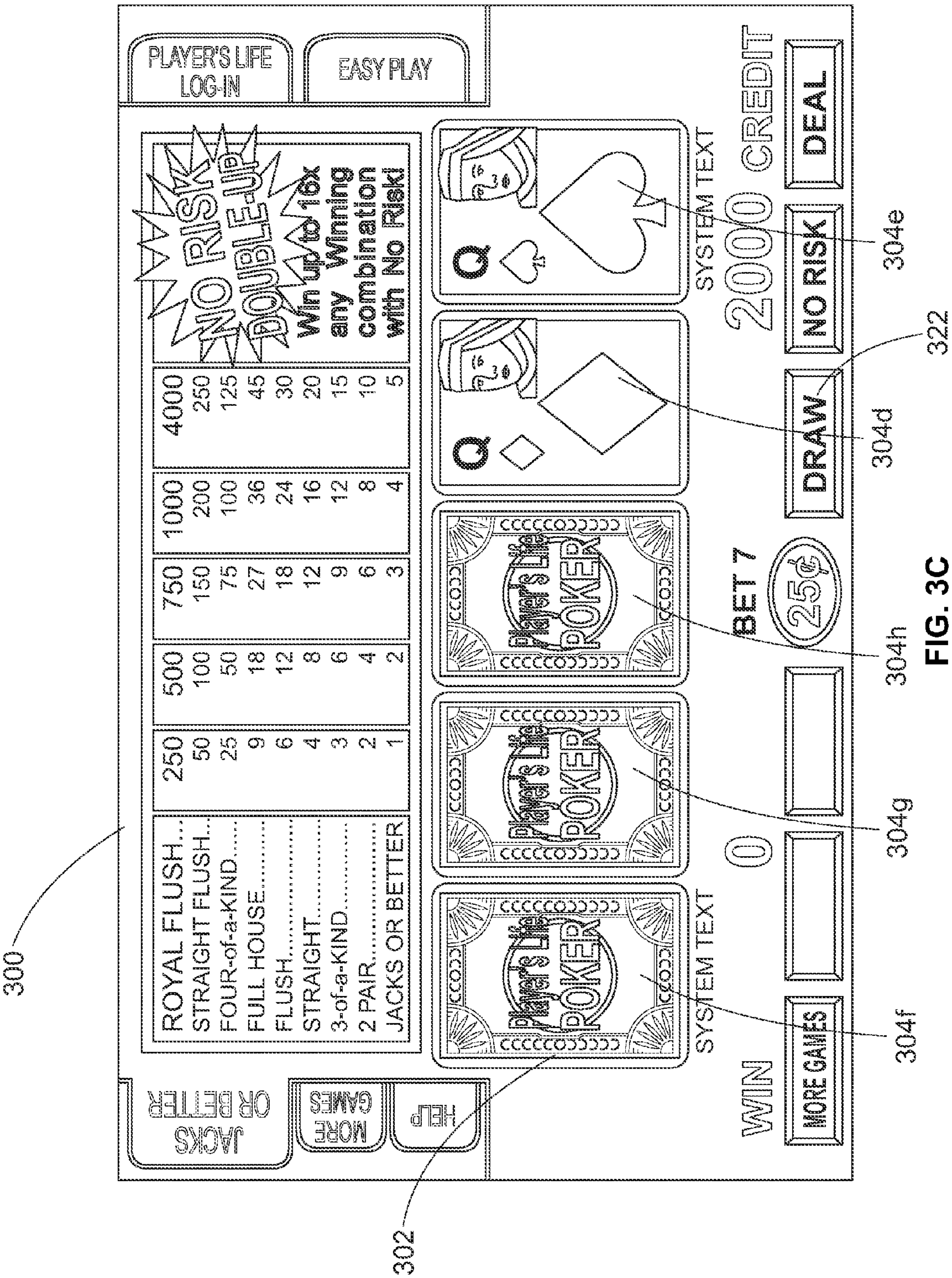
FIG. 3C is an image of the video poker-game in FIG. 3A showing the example poker-themed wagering game after a player selection of cards to discard.
Figure 3D:
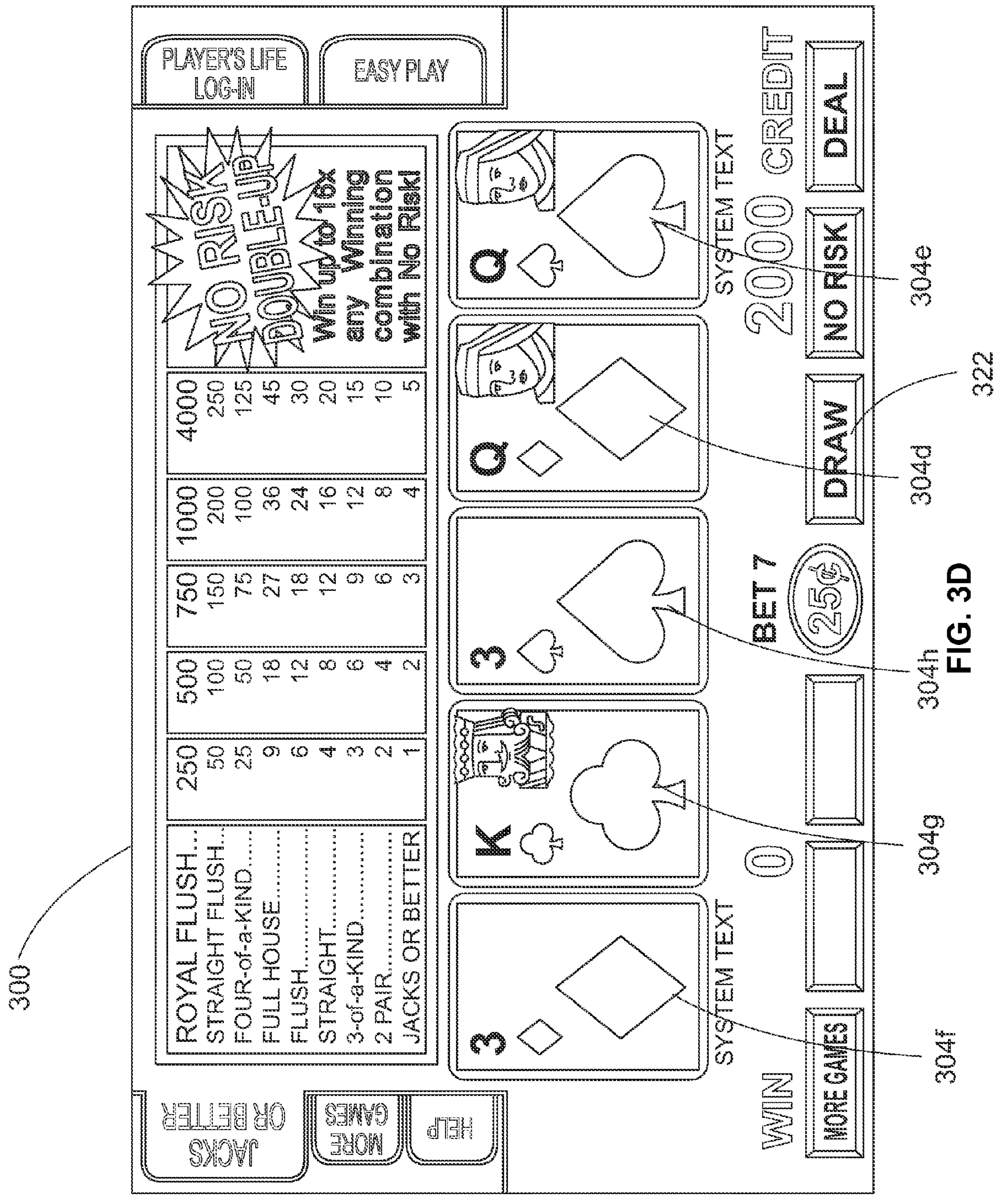
FIG. 3D is an image of the video poker-game in FIG. 3D showing the example poker-themed wagering game after replacement cards have been added to form a playable hand.

FIG. 3C is an image of the video poker game in FIG. 3B showing the example poker-themed wagering game after a player has selected cards to hold. FIG. 3D is an image of the video poker game in FIGS. 3A-3B showing the example poker-themed wagering game after replacement cards have been added to the held cards to form a playable hand. In FIG. 3C, a player has selected two cards 304*d*, and 304*e* to hold. As illustrated in FIG. 3D, the three discarded cards 304*a*, 304*b*, 304*c* are replaced with three additional cards 304*f*, 304*g*, 304*h*—randomly selected from the remaining deck—to form a second or final user-playable hand.

At the end of the basic wagering game, the highest-ranked poker hand is determined from the final user-playable hand and a player is awarded a primary payoff as displayed in the pay table 308 if the ranking of the user playable hand meets the predetermined non-monetary criteria or hand ranking displayed in the pay table 308.

The basic wagering game shown in FIGS. 3A-3C includes a secondary-feature that allows a player greater awards. The basic wagering game awards a payoff based on one of a plurality of winning outcomes such as a ranking of the user-playable hand meeting a predetermined non-monetary criterion such as the ranking of poker hands. The opportunity to earn a bonus feature with an expected value based on the ranking of the user-playable hand meeting one of the predetermined criterion is provided. In this example, the expected value of the secondary-feature may be increased in proportion to the ranking of the winning user-playable hand from the basic-game. This may be achieved by increasing the probability of an award of the secondary-feature or the amount of the award of the secondary-feature in association with the ranking of the winning hand in the basic-game.

Figure 4A:
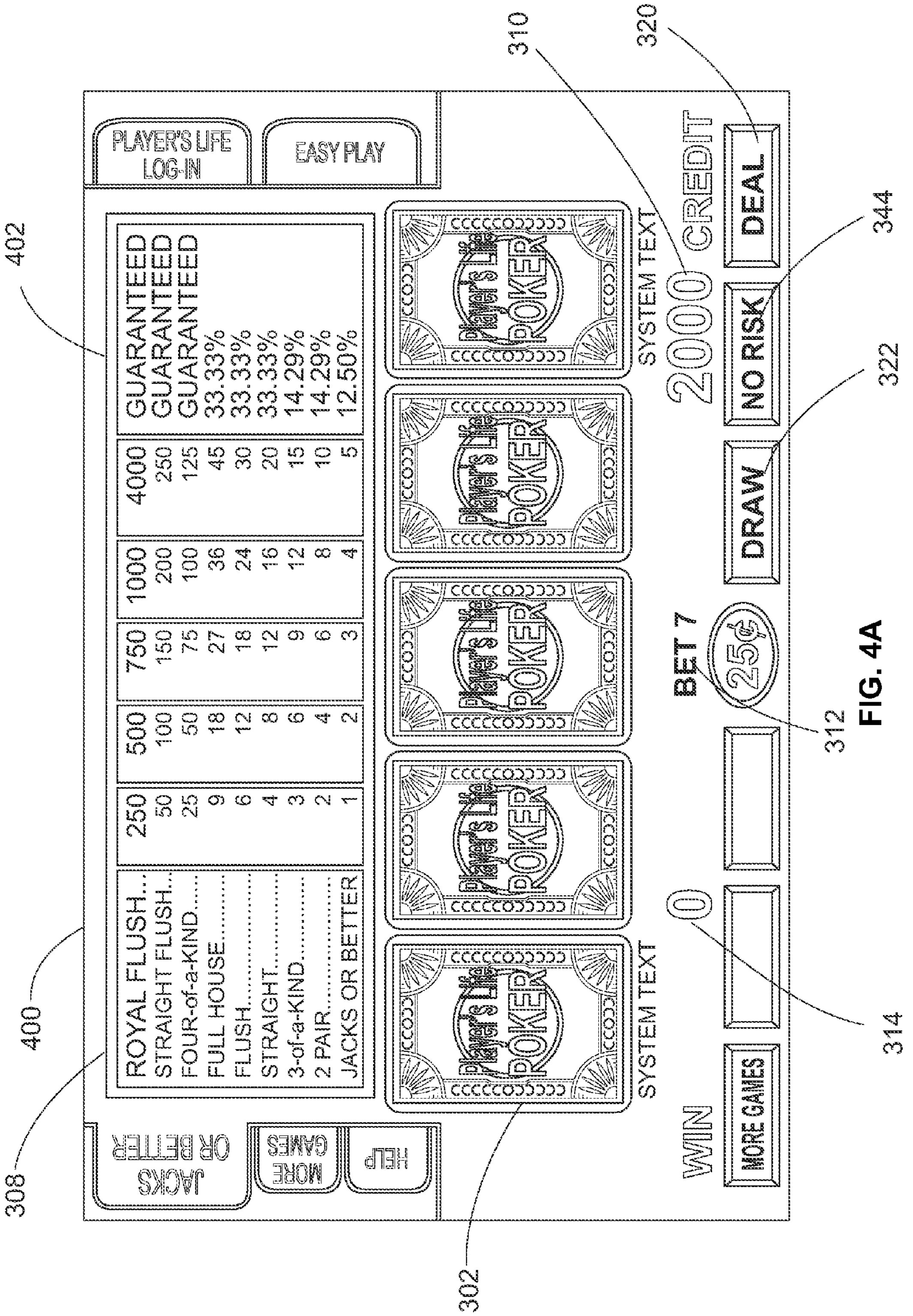
FIG. 4A is an image of the poker-themed game in FIGS. 3A-3D that has a special bonus feature having a value that depends on the ranking of a user playable hand.

One example shown in FIGS. 4A-4D is altering the probability of achieving a secondary-feature based on the primary-award level in the no-risk double-up feature represented by the field 342 in FIG. 3A. Identical elements in FIG. 4A-4D to those in FIG. 3A are labeled with identical numerals. The no-risk double-up feature is awarded to players at random times following a player's gameplay assuming a maximum number of credits is wagered. FIG. 4A shows a game screen image 400 that may be displayed in the display area 14 in FIG. 1 when a player wagers the maximum number of credits and selects the no-risk double-up button 344. The screen image 400 is presented to a player with the paytable 308 including an additional column 402 of the probabilities of triggering the secondary double-up feature. As may be seen in column 402, the odds of triggering the double-up feature increase as the hand-value of the user-playable hand increases. For example, the secondary-feature has a 12.5% chance of being triggered if the player has jacks or better as a winning hand. The probability of triggering the secondary-feature is 14.29% in this example, if the winning hand is two pair or three of a kind. The probability is 33.33% of triggering the secondary-feature if the winning hand is a straight, a flush or a full house. In this example, if the winning hand is four of a kind or higher, the secondary-feature is guaranteed (probability of 100%).

Figure 4B:
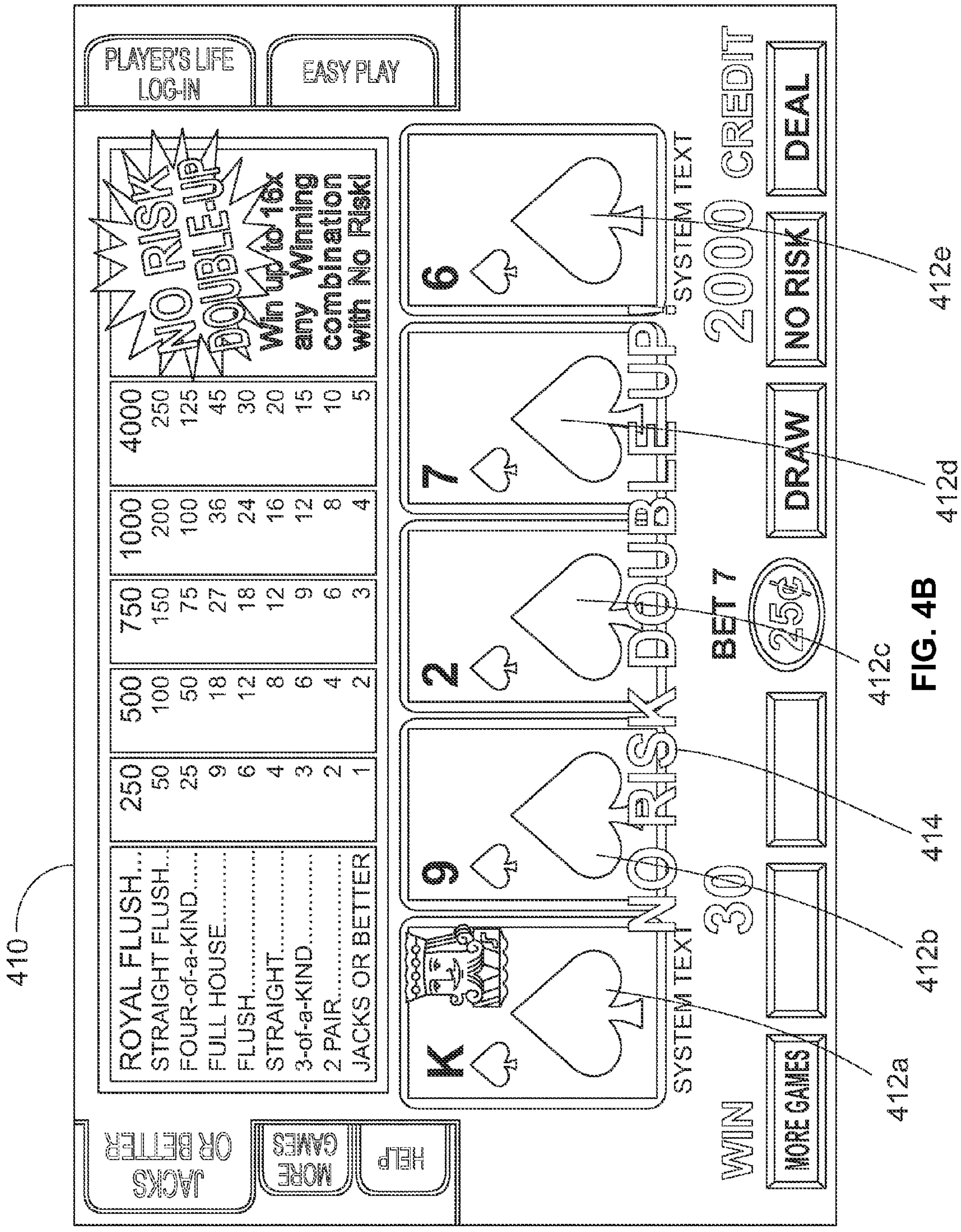
FIG. 4B-4D are images of the video poker game in FIG. 4A showing a sequence where a player may be awarded multipliers as a result of triggering the special bonus feature.

FIG. 4B shows a screen image 410 that is displayed when the no-risk double-up secondary-feature is triggered. In FIG. 4B, the player has achieved a winning hand of cards 412*a*-412*e* having a hand ranking of a flush. The player has wagered the maximum number of credits (5) and is awarded 30 credits. The player also added an additional wager of 2 credits for eligibility of the double-up secondary-feature via the no-risk double-up button 344. Since the winning hand is a flush, the probability of triggering the secondary-feature is 33.33%. When the secondary double-up feature is triggered, a text field 414 appears indicating the activation of the feature to the player.

Figure 4C:
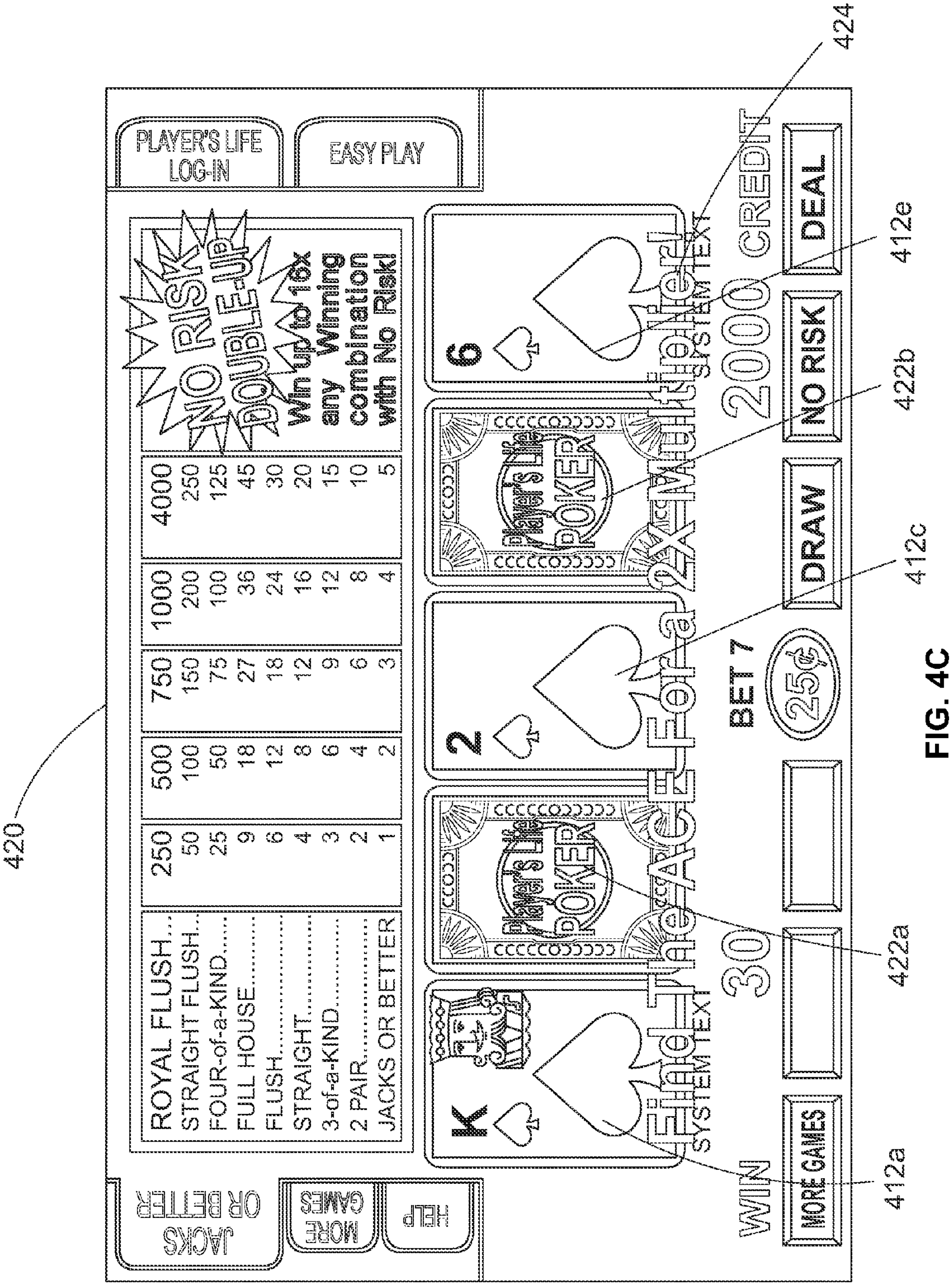

FIG. 4C shows a screen image 420 of the poker-themed game after the no-risk double-up feature is activated. The no-risk double-up feature provides the player the opportunity to multiply the payoff of the user-playable hand in the basic-game by selecting a player selectable element. The multiplier may be increased by successfully selecting a succession of player selectable elements. For example, in FIG. 4C, two face-down cards 422*a* and 422*b* are offered to the player on the hand 302. In FIG. 4C, instruction text 424 appears, which allows the player to select one of the two face-down cards 422*a* or 422*b* to find the ace. If the player successfully finds the ace, the award from the winning user playable hand in the basic-game is doubled and the player may move to the next stage.

Figure 4D:
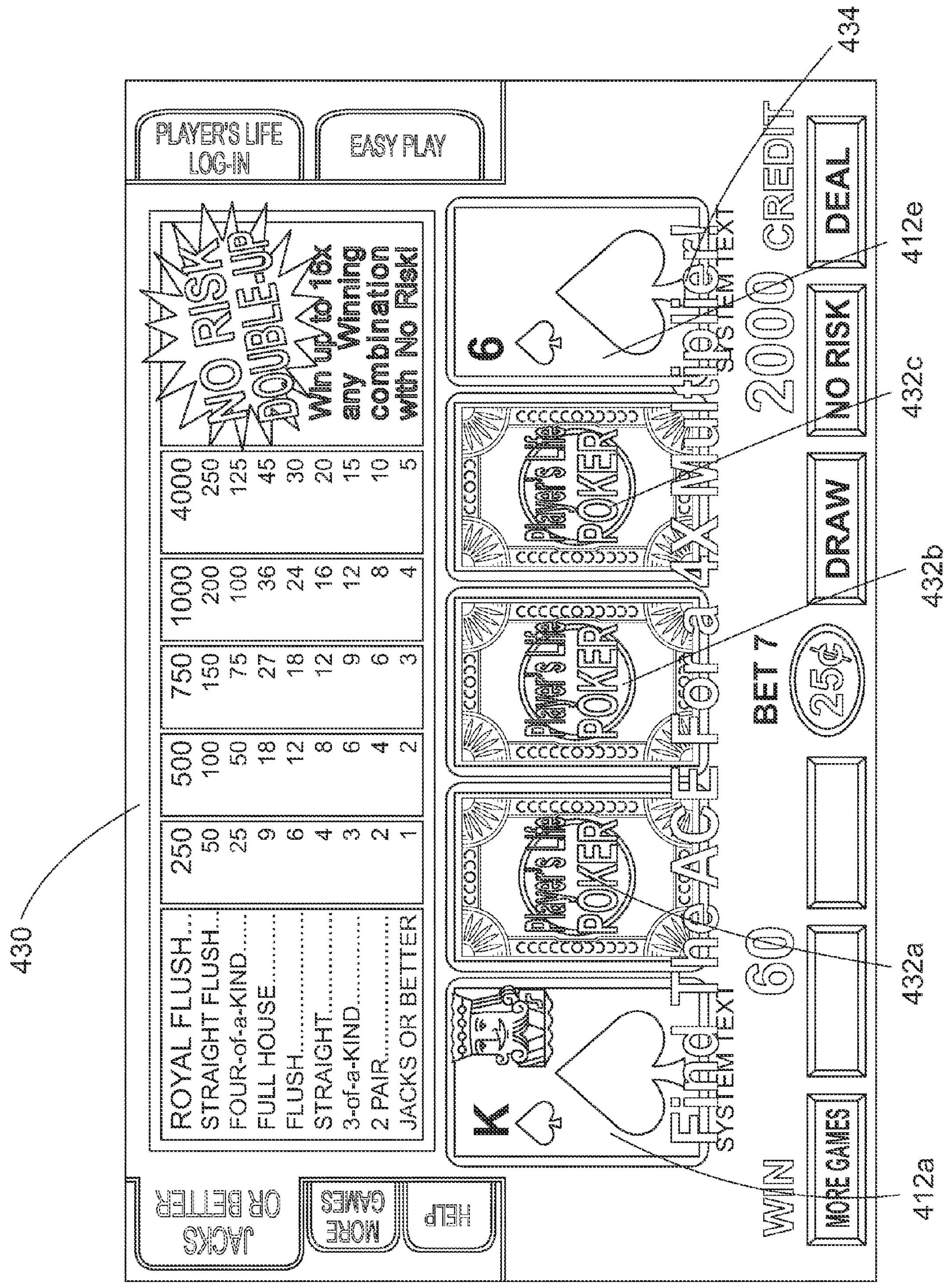

FIG. 4D shows a screen image 430 of the poker-themed wagering game when the player has successfully achieved the 2× multiplier from the selection of a face-down card 422*a* or 422*b* with an ace in FIG. 4C. In FIG. 4D, three cards 432*a*, 432*b*, and 432*c* are presented face-down to the player. The player is then instructed via instruction text 434 to select one of the face-down cards 432*a*, 432*b*, or 432*c* that has the ace to win a 4× multiplier of the basic-game award. Each successive level adds an additional face-down card for a chance at a higher multiplier, thus the player would have to select between four face-down cards to achieve the 8× multiplier and five cards to achieve the maximum 16× multiplier in successive screens.

Figure 5:
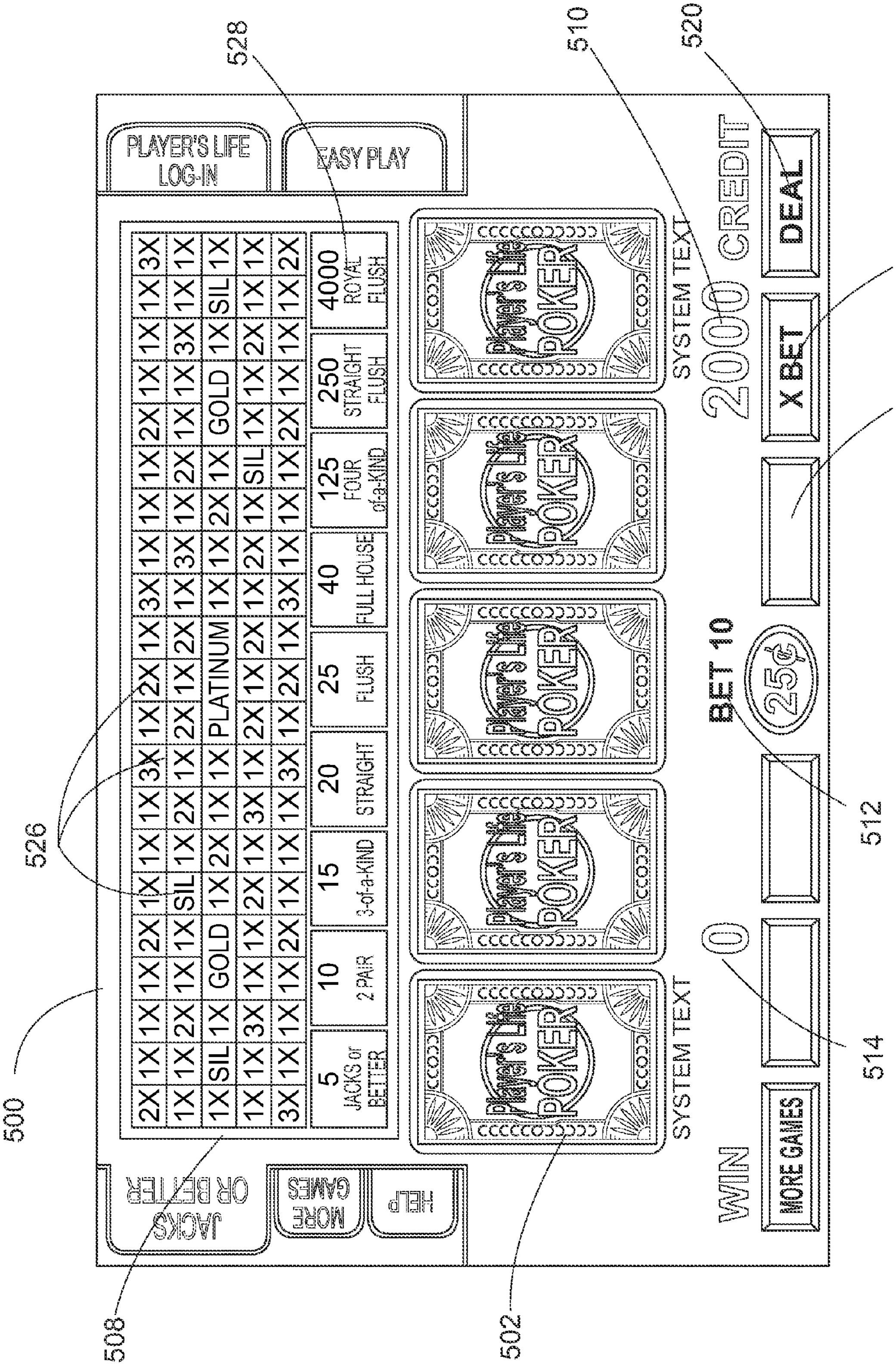
FIG. 5 is an image of a video poker game shown on the display area of the gaming machine in FIG. 1 with a multiple progressive bonus feature.
Figure 6:
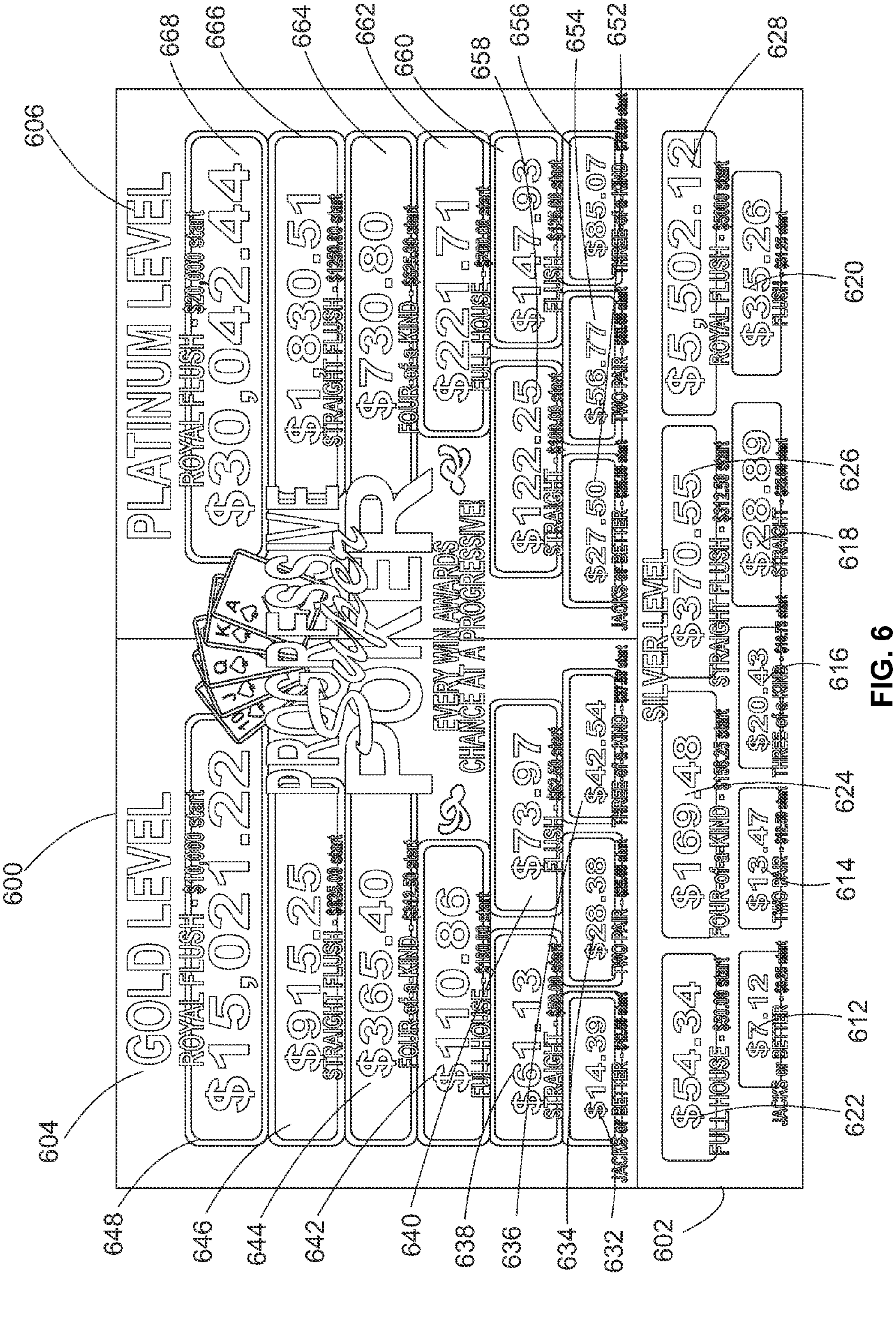
FIG. 6 is an image of an information screen of the video poker game in FIG. 5 showing the amounts of three different levels of progressives.
Figure 7:
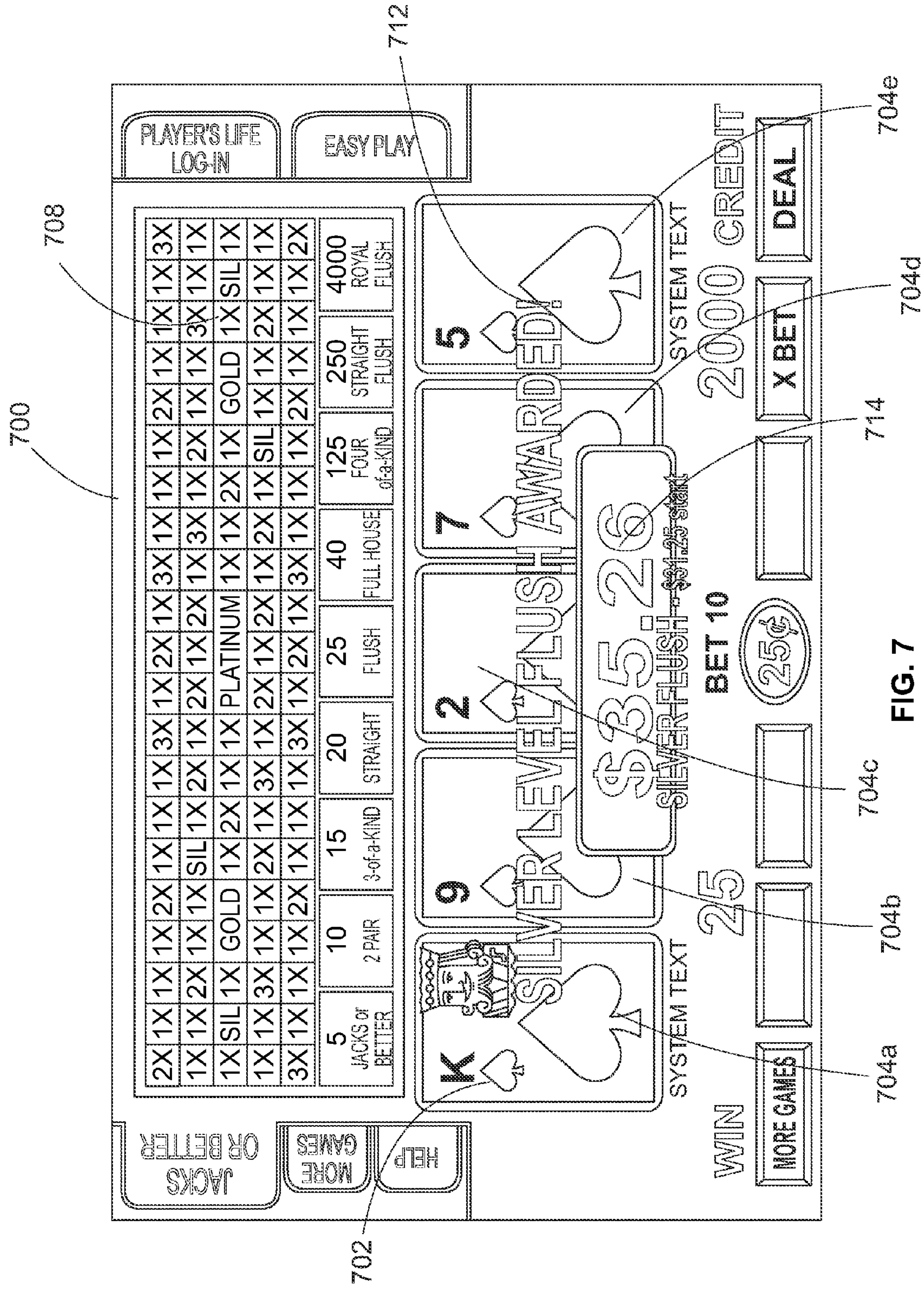
FIG. 7 is an image of the video poker game in FIG. 5 showing the awarding of one of the progressive level awards.

Another example of a secondary-feature with an expected value that is associated with the hand ranking of a winning hand in the basic-game is a super progressive feature where a secondary-feature's award value (i.e., the value of the awards of various progressive levels) is associated directly to the rank of the winning playable hand in the basic-game as shown in FIGS. 5-7. FIG. 5 is a screen display image 500 of a basic draw-poker game that may be displayed in the primary display area 14 or the secondary display area 16. FIG. 6 shows a screen image 600 that displays the different progressive-awards that may be associated with the basic poker-themed wagering game in FIG. 5 that is displayed on the secondary display area 16 in this example but could be displayed on the display area 14.

The screen display image 500 includes a playable hand 502 that allows a player to draw and replace cards for a winning combination similar to the basic poker game described above with reference to FIGS. 3A-3D. A "credits" meter 510 displays a number of credits available for play on the machine. A "bet" meter 512 displays a number of credits wagered (e.g., from 1 to 5 credits). A "paid" meter 514 for displays. The wagering game is initiated after a wager is made by a "deal" button 520 for causing the game to initially deal cards from a deck into the user-playable hand 502 face-up. A "draw" button 522 causes the game to replace any non-held card in the user-playable hand 502 with another card from the deck.

The basic-game shown in FIG. 5 may include a secondary bonus feature that may be activated with an extra wager activated via a progressive-bet button 524. If the extra wager or extra-coin bet is placed, the player is eligible for multipliers and progressives that increase the award value for the hand or whose value is tied to the hand outcome, respectively. The basic-game-screen image 500 includes a secondary-feature paytable 508 that includes the probabilities of receiving either a multiplier of up to 3× or eligibility for one of three different progressive levels in a set of result boxes 526. The paytable 508 also includes a hand ranking and basic payout area 528. The paytable 508 is displayed when the player makes an additional wager via the progressive-bet button 524. The eligibility for progressives and multipliers depends on the credits wagered via activating the progressive-bet feature button 524.

In this example, a one-credit side bet will activate the eligibility for 2× multipliers of the award in the basic-game for the result boxes 526 in the paytable 508. A two-credit side bet will activate the eligibility for the 2× multipliers and the 3× multipliers of the result boxes 526 of the paytable 508. A three-credit side bet will activate the eligibility for all of the multipliers and the lowest level or silver-level progressive result boxes 526 in the paytable 508. A four-credit side bet will activate the eligibility for all of the multipliers and the silver and gold level progressives result boxes 526 in the paytable 508. A five-credit side bet will activate the eligibility for all of the multipliers and all three progressives of the result boxes 526 in the paytable 508. The amount of credits wagered in the side bet will result in the activation of various result boxes 526 lighting up to show the availability of the respective multiplier or progressive in the paytable 508 in this example.

The progressive-awards are a result of contributions determined by the credits wagered by players on participating gaming machines. For example, for every time a gaming machine accepts a wager, a progressive controller increments the value of a progressive-award (e.g., 1% of the credits wagered). Progressive jackpots may be divided into multiple levels such as two, three, four, or more levels. Each jackpot level may be associated with different groups of participating gaming machines that contribute to that jackpot level. For example, the highest jackpot level may be a wide-area progressive (WAP) associated with gaming machines across multiple casinos, while the remaining jackpot levels may be local-area progressives (LAPs) associated with gaming machines at a single casino or bank of machines within the casino.

The progressive-award levels in this example are illustrated in the progressive-award information display image 600 in FIG. 6. The display image 600 includes a silver-level progressive area 602, a gold-level progressive area 604 and a platinum-level area 606. Each of the three progressives award different amounts based on the ranking of the winning hand. The amounts for the different progressives are displayed in the information screen display image 600. The lowest level progressive represented by the silver-level progressive area 602 has nine separate awards corresponding to the different rank of winning hands in the basic-game. The award amounts of the current silver progressives are displayed in award fields 612, 614, 616, 618, 620, 622, 624, 626, and 628. Thus, the lowest progressive amount ($7.12) in this example is displayed in award field 612, which corresponds to a hand having a pair of jacks or better. The highest progressive-award amount in this example ($5,502.12) is displayed in the award field 628 corresponding to a royal flush.

The next level of progressive-awards in this example is the gold-level progressives shown in the gold-level progressive area 604. The gold-level has nine separate progressive-awards corresponding to the different rank of winning hands in the basic-game. The award amounts in the gold progressives are higher than the amount for the same rank than those of the silver-level progressive-award amounts. The amounts of the current gold progressive-awards are displayed in award fields 632, 634, 636, 638, 640, 642, 644, 646, and 648. The lowest progressive amount in this example is displayed in award field 632 ($14.39), which corresponds to a hand having a pair of jacks or better. The highest progressive-award amount in this example is displayed in award field 648 ($15,021.22) corresponding to a royal flush.

Similarly, the highest level of progressive-awards in this example is the platinum-level progressives shown in the platinum-level progressive area 606. The platinum-level has nine separate progressive-awards corresponding to the different rank of winning hands. The award amounts in the platinum progressive-awards are higher than the amount for the same rank than those of the corresponding silver and gold-level progressive-award amounts for those ranks. The amount of the current gold progressives are displayed in award fields 652, 654, 656, 658, 660, 662, 664, 666, and 668. The lowest progressive-award amount in this example ($27.50) is displayed in award field 650 which corresponds to a hand having a pair of jacks or better. The highest progressive-award amount in this example ($30,042.44) is displayed in award field 668 corresponding to a royal flush.

FIG. 7 is a screen image 700 of the activation of a progressive bonus on the basic-game shown in FIG. 5. A player hand 702 includes face up cards 704*a-e* which have a winning combination ranking of a flush. The player in this example has placed a maximum side wager of five credits resulting in eligibility for all of the multiplier bonuses and the three levels of progressives. The placement of a side wager results in the display of a paytable 708 that includes the potential multiplier and progressive results. In this example, the player has been awarded a silver-level progressive-award and is notified by a text field 712 interposed over the player hand 702. The amount of the silver-level progressive is shown in an award field 714. The amount of the award is associated with the ranking of the hand. In this example, the flush is awarded an amount that is greater than the lower hand ranking of a straight but less than the next hand ranking of a full house.

In this example, the progressive-award levels are reset to a base level that is proportional to the level of the progressive when the progressive is awarded. For example, the progressive amounts in the silver progressive-awards are reset to 5 times the base pay for the particular hand ranking in the ranking and payout area 528 of the pay table 508 in FIG. 5. As shown in FIG. 7, the silver progressive-award for a flush is reset to five times the base pay (25×0.25) to $31.25. The progressive amounts in the gold progressive-awards are reset to 10 times the base pay in each level and the platinum-level progressive-awards are reset to 20 times the base pay in each level.

At the conclusion of a wagering game, the awarded credits are generally "banged-up" to the credit meter. "Bang-up," refers to the idea that credits are added to the meter in multiple increments rather than all at once. A canned audio and/or visual presentation may accompany the bang up and a specific sound may be used for each incremented value, but is not required. In both of these examples in FIGS. 4-7, the drawing for the secondary-feature itself may occur during the bang-up for the primary game award. Thus, the greater the secondary-feature award and the longer the bang-up, the longer the anticipation of the end result of the secondary-feature. In some embodiments, the player may receive a random draw for every X credits awarded, thus the higher the credit award, the more draws the player receives and the more likely it is that the player will receive the feature.

This is a very easy concept to grasp for poker as the hands and award values are tightly linked. In a slot game, however, this may become more variable. For example, the expected value of the secondary-feature could be tied to specific outcomes or just to award amounts in general. Thus, wins between X and Y credits may have a first probability of achieving the feature, whereas wins between Y and Z may have a second, higher probability of achieving the feature.

In prior art, the secondary feature triggered near the end of a primary game occurs over the course of short window less than a second long. This is done so that the game does not delay the player from starting the next game activation. An extra anticipation event at the end of each game may lead to player fatigue since they are in a hurry to start the next primary game. In the present examples, by confining the length of the anticipation sequence to the length of the bang-up event, the player does not incur any additional delay. The highlighting engages the player during the bang-up event, increasing entertainment value for the portion of the game that is not usually considered as engaging or relevant.

During the bang-up, a visual anticipation sequence occurs for the secondary feature. The anticipation event shows all of the award possibilities and highlights one or more of the possible awards sequentially along with sound cues. In one example, the highlighting stops at the conclusion of the bang-up on the outcome to be awarded, if any. This means that longer bang-ups would provide longer anticipation. It is possible, however, that the award could take place before the bang-up is finished. In addition, the player may press a button on the game to increase the speed of bang-up or activate an instant bang-up feature. In this case, the secondary feature award is awarded sooner to coincide with the bang-up finish.

Different types of anticipation highlighting are possible. In one example, there is at least one award and at least one non-award. Different outcomes on the primary game may either increase the number of awards relative to the non-awards or may increase the number of highlighting outcomes so as to increase the chance that an award is won. Alternately, a different outcome on the primary game may increase the value of the available awards on the secondary feature or may reduce the number of non-awards offering the player more value.

It should be understood that the above invention is not limited to a video poker system and may be instituted on a standard casino table or another means sufficient to conduct the above described wagering game. Specifically, the inventive concepts may be utilized within a stand-alone casino slot-game, as is apparent to one of ordinary skill in the art. Further, it should be noted that although the above examples are illustrated utilizing side wagers, additional or side wagers are not required to utilize these features in other implementations.

Each of these embodiments and obvious variations thereof is contemplated as falling within the spirit and scope of the claimed invention, which is set forth in the following claims.

What is claimed is:

1. A method of operating a gaming system primarily dedicated to conducting at least one casino wagering game, the gaming system including a gaming cabinet, one or more controllers, an electronic display device, and one or more electronic input devices, the electronic display device and the one or more electronic input devices being coupled to the gaming cabinet, the method comprising:

detecting, via at least one of the one or more electronic input devices, a physical item associated with a monetary value, the monetary value establishing a credit balance that changes based on play of the casino wagering game;

receiving, via a physical input to at least one of the one or more electronic input devices, an input indicative of a basic wager to play the at least one casino wagering game, the casino wagering game including a plurality of winning outcomes, the plurality of winning outcomes being ranked according to predetermined non-monetary criteria;

determining, by the one or more controllers, a randomly determined outcome of the casino wagering game;

displaying the outcome on the electronic display device;

awarding, by the one or more controllers, an award in response to the outcome meeting one of the plurality of winning outcomes;

providing the opportunity to earn a bonus feature with an expected value, the probability of earning the bonus feature being greater than 0% for each of the plurality of winning outcomes and the probability of earning the bonus feature increasing from the lowest ranking of the winning outcome to the highest ranking of the winning outcome; and receiving, via at least one of the one or more electronic input devices, a cashout input that initiates a payout from the credit balance.

2. The method of claim 1, wherein the plurality of winning outcomes are poker hands dealt from a card deck and the predetermined criteria are ranks of winning poker hands.

3. The method of claim 1, wherein the ranking of the winning outcome is based on the value of the award.

4. The method of claim 1, wherein a higher award value has a higher probability of triggering the bonus features than a lower award value.

5. The method of claim 1, wherein the bonus feature includes at least one set of awards, each award in the set of awards having a different value based on the ranking of the winning outcome.

6. A gaming system primarily dedicated to playing at least one casino wagering game comprising:

a gaming cabinet for housing components associated with the at least one casino wagering game;

an electronic display coupled to the gaming cabinet, the electronic display having a display area configured to display information or graphics to be displayed to a player including graphics of the at least one casino wagering game;

one or more electronic input devices coupled to the gaming cabinet, at least one of the one or more electronic input devices configured to detect a physical item associated with a monetary value that establishes a credit balance, and at least one of the one or more electronic input devices configured to receive a cashout input that initiates a payout from the credit balance, the credit balance changing based on play of the at least one casino wagering game; and one or more controllers configured to:

receive, via at least one of the one or more electronic input devices, an input indicative of a wager;

initiate the at least one casino wagering game in response to the input indicative of a wager;

randomly determine an outcome of the at least one casino wagering game;

direct the electronic display device to display the outcome;

provide a plurality of symbol-bearing objects to form a final outcome;

award an award based on a non-monetary ranking of the final outcome meeting one of a plurality of predetermined winning criteria; and provide the opportunity to earn a bonus feature with an expected value based on the ranking of the final outcome meeting one of the plurality of predetermined winning criterion, wherein each of the plurality of predetermined winning criterion has an associated probability of earning the bonus feature being greater than 0% and at least two probabilities of earning the bonus feature associated with the predetermined winning criteria are different from each other.

7. The gaming system of claim 6, wherein a higher ranking of the final outcome has a higher probability of triggering the bonus feature than a lower ranking of the final outcome.

8. The gaming system of claim 6, wherein the bonus feature includes multiplying the payoff of the final outcome.

9. The gaming system of claim 8, wherein the bonus feature includes a plurality of multipliers, and where the value of the multiplier is determined by a player-selectable element.

10. The gaming system of claim 9, wherein the player is offered successive selectable elements to increase the value of the multiplier.

11. The gaming system of claim 6, wherein the probability of earning the bonus feature is 100% for at least one of the predetermined criteria.

12. The gaming system of claim 6, wherein the bonus feature includes at least one set of progressive-awards, each award in the set of progressive-awards having a different value based on the ranking of the final outcome.

13. The gaming system of claim 6, wherein the final outcome is a final poker hand and the one or more controllers provide the plurality of symbol-bearing objects to form the final poker hand by:

providing an initial plurality of symbol-bearing objects;

discarding, via player selection, one or more of the provided symbol-bearing objects from the initial plurality of symbol-bearing objects;

replacing each of the discarded symbol-bearing objects with a replacement symbol-bearing object to form the final poker hand.

14. The gaming system of claim 6, wherein the bonus feature includes an award outcome and a non-award outcome.

15. The system of claim 6, wherein the one or more controllers are further configured to accept a side wager received from the electronic input device, and wherein the opportunity to earn a bonus feature is provided if a side wager is received.

16. The system of claim 15, wherein the bonus feature is selected from a plurality of bonus features based on the amount of the accepted side wager.

17. A method of operating a gaming system primarily dedicated to conducting at least one casino wagering game, the gaming system including a gaming cabinet, one or more controllers, an electronic display device, and one or more electronic input devices, the electronic display device and the one or more electronic input devices being coupled to the gaming cabinet, the method comprising:

detecting, via at least one of the one or more electronic input devices, a physical item associated with a monetary value, the monetary value establishing a credit balance that changes based on play of the casino wagering game;

receiving, via a physical input to at least one of the one or more electronic input devices, an input indicative of a basic wager to play the at least one casino wagering game;

determining, by the one or more controllers, a randomly determined outcome of the at least one casino wagering game;

displaying a plurality of symbol-bearing objects to form a winning final outcome on the electronic display;

awarding, by the one or more controllers, an award in response to a ranking of the winning final outcome meeting a predetermined criterion;

providing the opportunity to earn a bonus feature with an expected value based on the ranking of the winning final outcome meeting one of the plurality of the predetermined criterion, wherein the probability of providing the opportunity is greater than 0% for all of the rankings of the winning final outcome, the probability of providing the opportunity is based on the met predetermined criterion, and at least two probabilities of providing the opportunity are different from each other; and receiving, via at least one of the one or more electronic input devices, a cashout input that initiates a payout from the credit balance.

18. The method of claim 17, wherein the probability of earning the bonus feature is associated with the ranking of the final outcome meeting one of the predetermined criterion.

19. The method of claim 18, wherein the probability of earning the predetermined criterion is 100% for at least one ranking of the final outcome.

20. The method of claim 17, wherein the bonus feature includes multiplying the award of the final outcome.

21. The method of claim 20, wherein the bonus feature includes a plurality of multipliers, and where the value of the multiplier is determined by a player selectable element.

22. The method of claim 21, wherein the player is offered successive selectable elements to increase the value of the multiplier.

23. The method of claim 22, wherein the offer of successive selectable elements occurs during a predetermined time period to award the award.

24. The method of claim 17, wherein the bonus feature includes at least one set of progressive-awards, each award in the set of progressive-awards having a different value based on the ranking of the final outcome.

25. The method of claim 24, wherein the bonus feature includes a second set of progressive-awards, the second set of progressive-awards having a higher value for corresponding ranking of the final outcome than the first set of progressive-awards.

26. A method of operating a gaming system primarily dedicated to conducting a poker-themed wagering game, the gaming system including a gaming cabinet, one or more controllers, an electronic display device, and one or more electronic input devices, the electronic display device and the one or more electronic input devices being coupled to the gaming cabinet, the method comprising:

detecting, via at least one of the one or more electronic input devices, a physical item associated with a monetary value, the monetary value establishing a credit balance that changes based on play of the poker-themed wagering game;

receiving, via a physical input to at least one of the one or more electronic input devices, an input indicative of a basic wager to play the poker-themed wagering game;

determining, by the one or more controllers, a randomly determined outcome of the poker-themed wagering game;

displaying a plurality of symbol-bearing objects to form a user-playable hand on the electronic display;

awarding, by the one or more controllers, an award based on a winning ranking of the user-playable hand meeting a predetermined criterion;

providing the opportunity to earn a bonus feature with the probability of earning the bonus feature being greater than 0% for each of the winning rankings of the predetermined criterion and the probability of earning the bonus feature increasing from the lowest ranking of the winning user playable hand meeting one of the predetermined criterion to the highest ranking of the winning user playable hand meeting one of the predetermined criterion; and receiving, via at least one of the one or more electronic input devices, a cashout input that initiates a payout from the credit balance.

27. A method of operating a gaming system primarily dedicated to conducting a poker-themed wagering game, the gaming system including a gaming cabinet, one or more controllers, an electronic display device, and one or more electronic input devices, the electronic display device and the one or more electronic input devices being coupled to the gaming cabinet, the method comprising:

detecting, via at least one of the one or more electronic input devices, a physical item associated with a monetary value, the monetary value establishing a credit balance that changes based on play of the poker-themed wagering game;

receiving, via a physical input to at least one of the one or more electronic input devices, an input indicative of a basic wager to play the poker-themed wagering game;

determining, by the one or more controllers, a randomly determined outcome of the poker-themed wagering game;

displaying a plurality of symbol-bearing objects to form a user-playable hand on the electronic display;

awarding, by the one or more controllers, an award based on a winning ranking of the user-playable hand meeting a predetermined criterion;

providing a bonus feature having a plurality of outcomes including at least one outcome awarding an award value, the probability that the award value of the bonus feature is awarded being greater than 0% for each of the winning rankings and the probability that the award value is awarded increasing from the lowest winning ranking of the user playable hand meeting one of the predetermined criterion to the highest winning ranking of the user playable hand meeting one of the predetermined criterion; and receiving, via at least one of the one or more electronic input devices, a cashout input that initiates a payout from the credit balance.

* * * * *